United States Patent
Kasai et al.

(10) Patent No.: US 6,912,140 B2
(45) Date of Patent: Jun. 28, 2005

(54) SWITCHING POWER SUPPLY

(75) Inventors: Joji Kasai, Neyagawa (JP); Kazuhiro Hida, Neyagawa (JP); Hiroyuki Hirano, Maebashi (JP)

(73) Assignee: Onkyo Corporation, Neyagawa (JP)

( * ) Notice: Subject to any disclaimer, the term of this patent is extended or adjusted under 35 U.S.C. 154(b) by 0 days.

(21) Appl. No.: 10/407,984

(22) Filed: Apr. 4, 2003

(65) Prior Publication Data

US 2003/0198066 A1 Oct. 23, 2003

(30) Foreign Application Priority Data

Apr. 23, 2002 (JP) .......................................... 2002-121263
Mar. 5, 2003 (JP) .......................................... 2003-57939

(51) Int. Cl.$^7$ ................................................ H02M 1/00
(52) U.S. Cl. ............................................ 363/49; 323/901
(58) Field of Search ............................ 363/49; 323/901, 323/908

(56) References Cited

U.S. PATENT DOCUMENTS

| | | | | |
|---|---|---|---|---|
| 4,928,218 A | * | 5/1990 | Kluttz | ............................ 363/37 |
| 5,581,453 A | * | 12/1996 | Ueta et al. | ...................... 363/49 |
| 5,672,940 A | * | 9/1997 | Wu | ................................ 315/8 |
| 6,002,598 A | * | 12/1999 | Seinen et al. | .................. 363/49 |
| 6,205,037 B1 | * | 3/2001 | Fitzgerald, Jr. | .......... 363/21.02 |
| 6,246,596 B1 | * | 6/2001 | Yamazaki | ..................... 363/49 |
| 6,661,680 B2 | * | 12/2003 | Maruoka | ..................... 363/48 |

FOREIGN PATENT DOCUMENTS

| | | |
|---|---|---|
| JP | 01-174273 | 7/1989 |
| JP | 08-256477 | 10/1996 |
| JP | 9-93918 | 4/1997 |
| JP | 11-168883 | 6/1999 |
| JP | 2001-320878 | 11/2001 |
| JP | 2003-134806 | 5/2003 |

* cited by examiner

*Primary Examiner*—Gary L. Laxton
(74) *Attorney, Agent, or Firm*—Renner, Otto, Boisselle & Sklar, LLP

(57) ABSTRACT

In a switching power supply of the present invention, when a voltage output from start-up means is greater than a driving voltage produced by output means, the voltage from the start-up means is provided to control means, whereby the switching power supply can be started up reliably. Furthermore, when the voltage output from the start-up means is less than the driving voltage produced by the output means, the current path is blocked in the start-up means so that no voltage is provided to the control means from the start-up means, whereby it is possible to reduce the power consumption during the steady operation.

4 Claims, 7 Drawing Sheets

SWITCHING POWER SUPPLY

BACKGROUND OF THE INVENTION

1. Field of the Invention

The present invention relates to a switching power supply, and more particularly to a switching power supply that can be started up reliably and can operate at a reduced power consumption level during the steady operation.

2. Description of the Related Art

FIG. 8 is a block diagram illustrating a conventional switching power supply 801. In the switching power supply 801, an AC voltage input from the outside is converted to a DC voltage through a rectifier circuit 808 and a smoothing capacitor C801, and then converted, at a switching circuit 802, to an AC voltage of a higher frequency than the frequency of input AC voltage. Then, the AC voltage is output from the switching circuit 802 to the outside via a transformer 803 including a primary coil 809 and a secondary coil 810. Moreover, in the transformer 803, a voltage is obtained from a tertiary coil 811, which is used for driving a control circuit 813. Specifically, a constant voltage circuit 812 receives the voltage from the tertiary coil 811 and provides a constant voltage to the control circuit 813. The control circuit 813 is driven by the constant voltage provided thereto to turn ON/OFF the switching circuit 802. A start-up circuit 805 provides a power supply voltage V1 to the constant voltage circuit 812 via a resistor R801, whereby the control circuit 813 can be driven at the start-up of the switching power supply. Otherwise, the switching power supply may not be started up successfully because, at the start-up of the switching power supply, the switching circuit 802 is not operating, and the voltage from the tertiary coil 811 for driving the control circuit 813 is not available.

In the conventional switching power supply 801, a voltage is occurred at the resistor R801 due to the difference between the power supply voltage V1 and a voltage V2 from the tertiary coil 811, whereby a current constantly flows to a capacitor C802, not only at the start-up but also during the steady operation. This results in a wasteful power consumption at the resistor R801 during the steady operation.

In order to solve this problem, a switching power supply 901 as illustrated in FIG. 9 (only a start-up circuit 905 is shown for the sake of simplicity) has been proposed in the art. As an external power supply is input to the switching power supply 901 at the start-up, a current flows into the capacitor C802 and constant voltage circuit 812 via a resistor R901 and a capacitor C903 while in the transient state, and the level of the current decreases with a predetermined time constant. Then, during the steady operation, a current that is determined by the resistance of the resistor R901 and that of a resistor R902 flows into the capacitor C802. Therefore, the transient current at the start-up can be increased by decreasing the resistance of the resistor R901, and the current flowing during the steady operation can be decreased by increasing the resistance of the resistor R902, whereby it is possible to reduce the wasteful power consumption. Moreover, the amount of time for which the transient current flows can be controlled by adjusting the value of the capacitor C903.

With the switching power supply 901, however, the amount of transient current flowing into the capacitor C802 and constant voltage circuit 812 varies substantially depending on the residual voltage of the voltage V1 and the residual charge stored in the capacitor C903 at the time of power-on, whereby the switching power supply 901 may not be started up reliably.

Furthermore, Japanese Laid-Open Patent Publication No. 9-93918 describes switching power supply for turning off the switching means 3, upon detection of a vibration voltage generated in an output of the tertiary coil 63 of the transformer 6 at the time of starting the intermittent operation of the power supply control circuit 11. However, in the switching power supply, a resistor element 42 is indispensable because of turning OFF MOSFET 31 with voltage drop of the resistor element 42. Therefore, because the power supply control circuit 11 is always driven by a current flow via the resistor element 42, a wasteful power consumption is caused at the resistor element 42 during the steady operation.

SUMMARY OF THE INVENTION

It is an object of the present invention to provide a switching power supply that can be started up reliably and can operate with a reduced wasteful power consumption during the steady operation.

A switching power supply of the preferred embodiments includes: switching means for receiving an external power supply and being turned ON/OFF so as to output a pulse; output means for receiving an output from the switching means to output a voltage to an outside and producing a driving voltage; start-up means including a transistor for receiving the external power supply to produce a driving voltage; and control means driven by the driving voltage produced by the output means or the driving voltage produced by the start-up means for turning ON/OFF the switching means, wherein: when the driving voltage produced by the start-up means is greater than the driving voltage produced by the output means, the driving voltage from the start-up means is provided to the control means; and when the driving voltage produced by the start-up means is less than the driving voltage produced by the output means, the transistor is turned OFF based on an electric potential difference between a voltage to be provided to a control electrode of the transistor and the driving voltage produced by the output means, so that no driving voltage is provided from the start-up means to the control means.

When the driving voltage produced by the start-up means is greater than the driving voltage produced by the output means, the driving voltage from the start-up means is provided to the control means, whereby the switching power supply can be started up reliably. Moreover, when the driving voltage produced by the start-up means is less than the driving voltage produced by the output means, the current path is blocked in the startup means so that no driving voltage is provided from the start-up means to the control means, whereby it is possible to reduce the wasteful power consumption during the steady operation. Furthermore, a time constant circuit as illustrated in FIG. 9 is not used for reducing the power consumption during the steady operation, whereby the switching power supply can be started up quite reliably. Furthermore, it is not necessary to provide a resistor element between the output means and the control means, because the transistor is turned OFF based on an electric potential difference between the voltage to be provided to a control electrode of the transistor and the driving voltage produced by the output means. Therefore, it is possible to reduce the wasteful power consumption quite desirably during the steady operation.

In a preferred embodiment, the start-up means further includes a constant voltage generation section for receiving the external power supply to provide a constant voltage to the control electrode of the transistor.

The start-up means includes the constant voltage generation section, whereby the driving voltage from the start-up means can be kept at a constant level. Therefore, at the start-up, the driving voltage from the start-up means is constant and does not decrease below the voltage required to drive the control means, whereby the switching power supply can be started up reliably. Moreover, during the steady operation, it is possible to prevent the driving voltage from the start-up means from becoming greater than that from the output means, whereby it is possible to reliably prevent the wasteful power consumption.

In a preferred embodiment, the transistor is a MOSFET; the constant voltage generation section includes a Zener diode whose cathode is connected to a gate of the MOSFET; and the start-up means further includes a first resistor provided between a drain of the MOSFET and an external power supply line, and a second resistor provided between the gate of the MOSFET and the external power supply line.

Since the transistor is a MOSFET, it is not necessary to provide a current to the gate, whereby the resistance of the second resistor, which is the gate resistor, can be set to a large value. Therefore, during the steady operation, a current flows through the second resistor. However, the current can be reduced to a very small value, thereby quite desirably reducing the wasteful power consumption. Furthermore, with the provision of the first resistor, it is possible to prevent an excessive current from flowing through the MOSFET and to prevent the MOSFET from being damaged.

In a preferred embodiment, the start-up means further includes a thermal protection element whose resistance increases when a temperature thereof exceeds a predetermined temperature.

The start-up means includes the thermal protection element, and the resistance of the thermal protection element rapidly increases when the temperature of the MOSFET exceeds a predetermined temperature. Thus, the current flow to the MOSFET can be restricted to decrease the temperature of the MOSFET, thereby preventing the MOSFET from being damaged.

In a preferred embodiment, the start-up means further includes a fuse element that is opened when a current flow therethrough exceeds a predetermined value.

The start-up means includes the fuse element, and the fuse element is opened when the current flow to the MOSFET exceeds a predetermined value. Therefore, it is possible to prevent an excessive current from flowing to the MOSFET, thereby preventing the MOSFET from being damaged.

A switching power supply of the other preferred embodiments includes: switching means for receiving an external power supply and being turned ON/OFF so as to output a pulse; output means for receiving an output from the switching means to output a voltage to an outside and producing a driving voltage; start-up means including a transistor for receiving the external power supply to produce a driving voltage; control means driven by the driving voltage produced by the output means or the driving voltage produced by the start-up means for turning ON/OFF the switching means; and voltage switching means for switching a voltage to be provided to a control electrode of the transistor to a voltage that is less than a minimum input voltage required to drive the control means, when the driving voltage produced by the output means is greater than the minimum input voltage required to drive the control means, wherein: when the driving voltage produced by the start-up means is greater than the driving voltage produced by the output means, the driving voltage from the start-up means is provided to the control means; and when the driving voltage produced by the start-up means is less than the driving voltage produced by the output means, a current path is blocked in the start-up means so that no driving voltage is provided from the start-up means to the control means.

Therefore, the driving voltage of the start-up means will not be greater than that from the output means unless the driving voltage from the output means is decreased below V2 min. Thus, it is possible to reliably prevent a driving voltage from being provided from the start-up means during the steady operation, thereby reliably reducing the wasteful power consumption.

In a preferred embodiment, when the driving voltage produced by the start-up means is less than the driving voltage produced by the output means, the transistor is turned OFF based on an electric potential difference between the voltage to be provided to a control electrode of the transistor and the driving voltage produced by the output means, so that no driving voltage is provided from the start-up means to the control means.

In a preferred embodiment, the voltage switching means includes a switching element for being turned ON/OFF based on the driving voltage produced by the output means so as to switch the voltage to be provided to the control electrode of the transistor.

The voltage switching means includes the switching element, whereby it is possible, with a simple circuit configuration, to switch the voltage to be provided to the control electrode of the transistor by turning ON the switching element.

In a preferred embodiment, the start-up means further includes a constant voltage generation section for receiving the external power supply to provide a constant voltage to the control electrode of the transistor.

In a preferred embodiment, the transistor is a MOSFET; the constant voltage generation section includes a Zener diode whose cathode is connected to a gate of the MOSFET; and the start-up means further includes a first resistor provided between a drain of the MOSFET and an external power supply line, and a second resistor provided between the gate of the MOSFET and the external power supply line.

In a preferred embodiment, the voltage switching means includes a transistor and a third resistor; one end of the third resistor is connected between the second resistor and the Zener diode; and the other end of the third resistor is connected to the transistor.

Therefore, the voltage to be provided to the gate of the MOSFET can be switched from the constant voltage from the Zener diode to a voltage that is determined by the second resistor and the third resistor, by turning ON the transistor. Thus, the voltage to be provided to the control electrode of the MOSFET can be switched to the voltage that is less than the minimum input voltage required to drive the control means by setting the resistance of the second resistor and that of the third resistor.

In a preferred embodiment, the start-up means further includes a thermal protection element whose resistance increases when a temperature thereof exceeds a predetermined temperature.

In a preferred embodiment, the start-up means further includes a thermal protection element whose resistance increases when a temperature thereof exceeds a predetermined temperature.

In a preferred embodiment, the start-up means further includes a fuse element that is opened when a current flow therethrough exceeds a predetermined value.

DETAILED DESCRIPTION OF THE PREFERRED EMBODIMENTS

Figure 1:
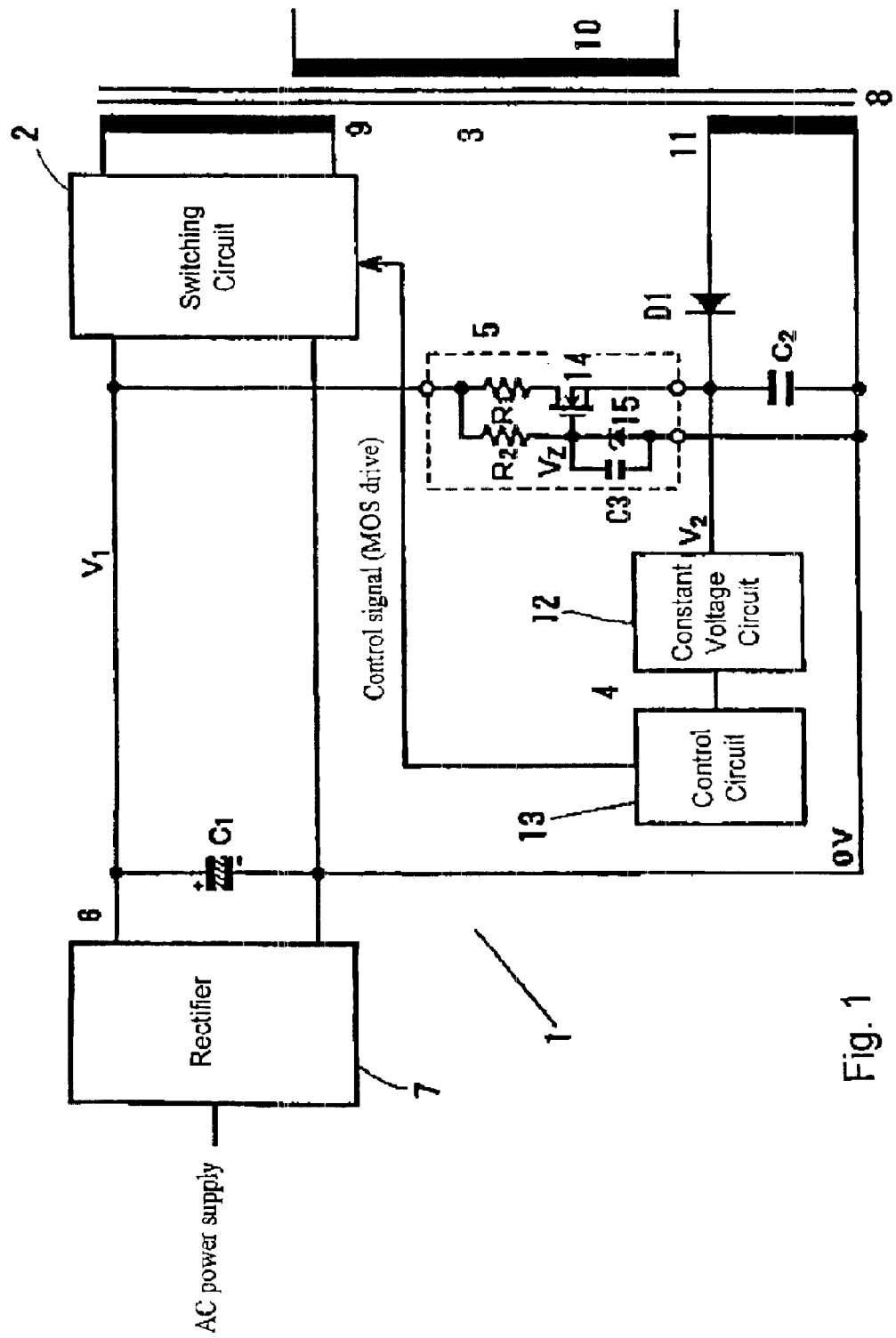
FIG. 1 is a block diagram illustrating a switching power supply according to a preferred embodiment of the present invention.

Preferred embodiments of the present invention will now be described with reference to the accompanying drawings. Note however that the present invention is not limited to the particular embodiments set forth below. FIG. 1 is a block diagram illustrating a switching power supply 1 according to a preferred embodiment of the present invention. The switching power supply 1 includes switching means 2, output means 3, control means 4, and start-up means 5. The switching power supply 1 further includes rectifying and smoothing means 6. Note that in the present embodiment, the term "startup" refers to a stage of operation when the driving voltage from the start-up means 5 is greater than that from the output means 3, and the term "steady operation" refers to another stage of operation when the driving voltage from the start-up means 5 is less than that from the output means 3.

The rectifying and smoothing means 6 rectifies and smoothes an AC power supply voltage input from the outside to output a DC voltage V1. The rectifying and smoothing means 6 includes a rectifier circuit 7 and a smoothing capacitor C1, for example.

For example, the switching means 2 includes a switching circuit in which a plurality of switching elements are connected together in a half-bridge or full-bridge circuit configuration. The switching elements may typically be MOSFETs. The switching means 2 receives an external power supply (the DC voltage V1, which has been rectified and smoothed by the rectifying and smoothing means 6) through an external power supply line that is connected to the switching means 2, and the switching elements are turned ON/OFF by a control signal from the control means 4, to output a pulse. The output voltage from the switching means 2 is provided to a first coil section 9.

The output means 3 outputs a voltage to the outside of the switching power supply 1, and also produces a driving voltage. The output means 3 includes, for example, a core section 8, the first coil section 9, a second coil section 10, and a third coil section 11. The output means 3 receives a voltage from the switching means 2, and outputs a voltage to the outside through the second coil section 10 based on the turns ratio between the first coil section 9 and the second coil section 10. On the other hand, the output means 3 provides a driving voltage for driving the control means 4 through the third coil section 11 based on the turns ratio between the second coil section 10 and the third coil section 11. Specifically, a current from the third coil section 11 is stored in a capacitor C2 via a diode D1, and the stored voltage is used as the driving voltage to be provided to the control means 4.

The control means 4 turns ON/OFF the switching elements of the switching means 2. The control means 4 includes a constant voltage circuit 12 and a control circuit 13. The constant voltage circuit 12 receives a driving voltage from the output means 3 (the third coil section 11) or the start-up means 5, and provides a constant voltage to the control circuit 13. The control circuit 13 receives the constant voltage from the constant voltage circuit 12, and turns ON/OFF each switching element of the switching means 2. Specifically, the control circuit 13 provides a control voltage to the gate of each MOSFET of the switching means 2.

The start-up means 5 receives an external power supply (the voltage V1) (i.e., the start-up means 5 is connected to an external power supply line), and provides a driving voltage to the control means 4 at the start-up of the switching power supply. Specifically, the start-up means 5 provides the driving voltage to the control means 4 when the driving voltage from the start-up means 5 is greater than that from the third coil section 11. On the other hand, when the driving voltage from the start-up means 5 is less than that from the third coil section 11, the current path is blocked so that the driving voltage is not provided to the control means 4. For example, the start-up means 5 includes a transistor 14, and the current path can be blocked by turning OFF the transistor 14.

The transistor 14 may be of any suitable type, but is preferably a MOSFET. Since it is not necessary, with a MOSFET, to provide a current to the gate, the resistance of a gate resistor R2 can be set to a large value, whereby it is possible to reduce the wasteful power consumption during the steady operation. In the MOSFET 14, the drain is connected to the external power supply line V1 via a resistor R1, the gate is connected to the external power supply line V1 via the resistor R2, and the source is connected to the capacitor C2 (i.e., the input of the constant voltage circuit 12). Thus, a current flows from the external power supply line into the capacitor C2 and constant voltage circuit 12 via the MOSFET 14, thereby charging the capacitor C2 to provide the driving voltage. With the provision of the resistor R1, it is possible to protect the MOSFET 14 by preventing an excessive current from flowing through the MOSFET 14.

The start-up means 5 further includes a constant voltage generation section 15 for providing a constant voltage Vz to the control electrode (gate) of the MOSFET 14. The constant voltage generation section 15 typically includes a Zener diode. With the provision of the Zener diode 15, a constant driving voltage can be obtained from the startup means 5. Therefore, at the start-up, the driving voltage from the start-up means 5 is constant and will not be lower than the voltage required to drive the control means 4, whereby the switching power supply 1 can be started up reliably. The Zener diode 15 has its cathode connected to the gate of the MOSFET 14 and its anode connected to the external power supply at 0V. Therefore, the driving voltage from the start-up means 5 (the voltage stored in the capacitor C2) is Vz−Vth. Note that Vth is the threshold voltage of the MOSFET 14. Moreover, a capacitor C3 is provided in parallel to the Zener diode 15. With the provision of the capacitor C3, the gate voltage of the MOSFET 14 can be increased gradually so that an excessive current does not flow into the capacitor C2 through the MOSFET 14.

Herein, Expression 1 below is satisfied, where V2 is the voltage provided to the constant voltage circuit 12 (the voltage of the capacitor C2), V2 min is the minimum input voltage that is required to drive the control means 4, and V3 is the driving voltage obtained from the third coil section 11 during the steady operation. Therefore, the control means 4 can be driven by the driving voltage from the start-up means 5 at the start-up, while no driving voltage is provided from the start-up means 5 during the steady operation.

$$V2 \min < Vz - Vth < V3 \qquad \text{Expression 1}$$

Figure 2:
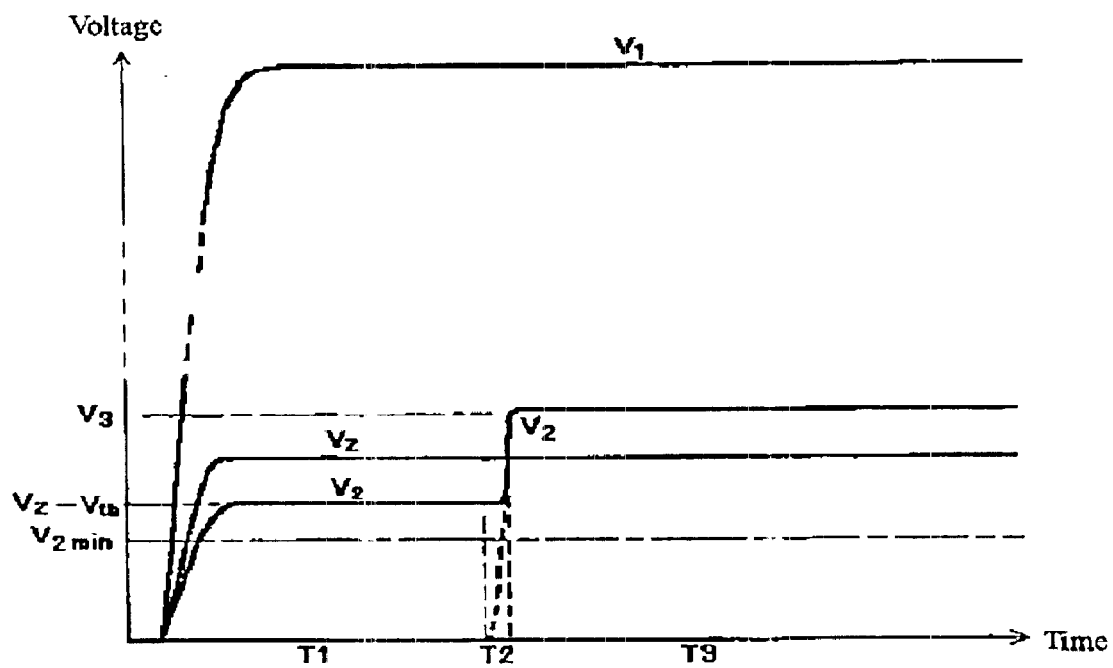
FIG. 2 is a waveform diagram illustrating an operation of a switching power supply of the present invention.
Figure 3:
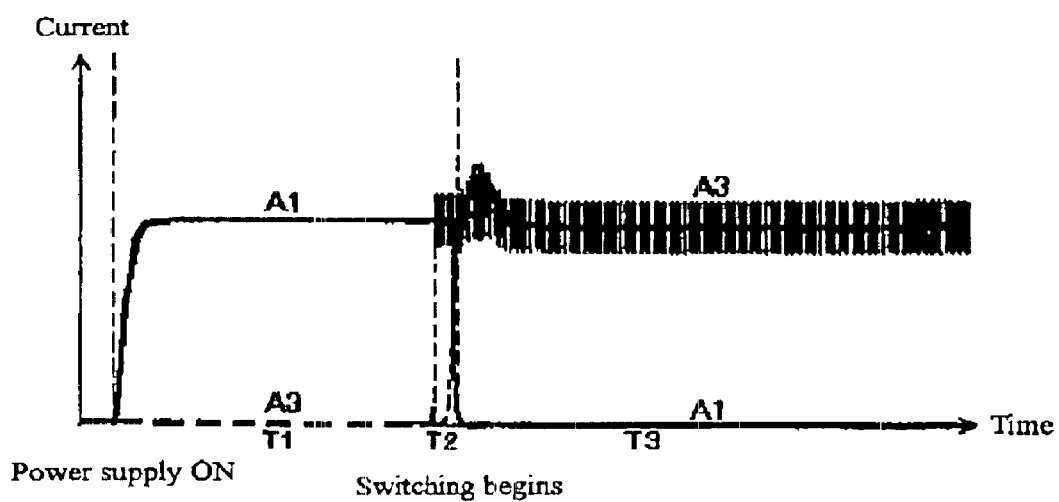
FIG. 3 is a waveform diagram illustrating an operation of a switching power supply of the present invention.

The operation of the switching power supply 1 having such a configuration will be described with reference to FIG. 2 and FIG. 3. FIG. 2 is a waveform diagram illustrating the voltages V1, V2 and Vz, and FIG. 3 is a waveform diagram illustrating a current A1 flowing through the MOSFET 14 and a current A3 from the third coil section 11.

When a power supply voltage is input from the outside before the start of a switching operation (period T1), the voltage V1 is provided to the Zener diode 15, and the constant voltage Vz occurs at the cathode of the Zener diode 15 (FIG. 2). Then, the constant voltage Vz is provided to the gate of the MOSFET 14, whereby the current A1 flows from the external power supply line V1 into the capacitor C2 and constant voltage circuit 12 via the resistor R1 and the MOSFET 14 (FIG. 3), thus charging the capacitor C2. Therefore, the voltage of the capacitor C2 (the source voltage of the MOSFET 14) is Vz–Vth. Thus, the voltage V2 to be provided to the constant voltage circuit 12 is V2=Vz–Vth (FIG. 2). On the other hand, the current A3 does not flow from the third coil section 11 because the switching means 2 is not performing the switching operation in period T1 (FIG. 3). Herein, since Vz–Vth>V2 min based on Expression 1, the control means 4 can be started up reliably, and the switching means 2 can start the switching operation.

In period T2, the switching means 2 starts the switching operation in response to a control signal from the control circuit 13. By switching means 2 performing the switching operation, when the driving voltage from the third coil section 11 becomes greater than that from the start-up means 5 (Vz–Vth), the current A3 flows from the third coil section 11 (FIG. 3), thereby charging the capacitor C2 via the diode D1.

In period T3, due to the current from the third coil section 11, the voltage stored in the capacitor C2 exceeds Vz–Vth and finally reaches the voltage V3. Thus, the voltage V2 to be provided to the constant voltage circuit 12 is increased to V2=V3 (FIG. 2), and the switching power supply transitions into the steady operation. During this period, the current A3 flows from the third coil section 11 to continue to charge the capacitor C2. Thus, the driving voltage V3 from the third coil section 11 is provided to the constant voltage circuit 12. On the other hand, the source voltage of the MOSFET 14 is V3, and V3>Vz–Vth based on Expression 1, whereby the gate-source voltage of the MOSFET 14 is less than the threshold voltage, thus turning OFF the MOSFET 14. Therefore, the current A1 no longer flows from the external power supply line V1 into the capacitor C2 and constant voltage circuit 12 via the resistor R1 and the MOSFET 14 (FIG. 3). Thus, no driving voltage is provided from the start-up means 5 to the constant voltage circuit 12. Since the current A1 does not flow, it is possible to prevent the wasteful power consumption at the resistor R1 and the MOSFET 14.

Moreover, in period T3, a current flows from the external power supply line V1 to the resistor R2 and the Zener diode 15. However, since the resistance of the resistor R2 can be set to a large value, as described above, it is possible to quite desirably reduce wasteful power consumption at the resistor R2.

As described above, the switching power supply can be started up reliably by providing a driving voltage from the start-up means 5 to the control means 4. During the steady operation, the driving voltage from the output means 3 is provided to the control means 4, and the MOSFET 14 is turned OFF, whereby it is possible to quite desirably reduce the wasteful power consumption at the start-up means 5.

Figure 4A:
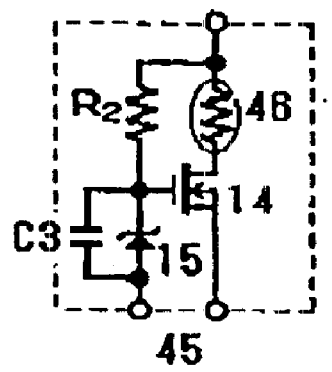
FIG. 4A to FIG. 4C are block diagrams each illustrating a switching power supply according to another embodiment of the present invention.
Figure 4B:
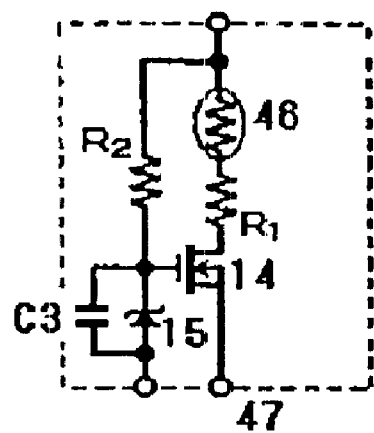
Figure 4C:
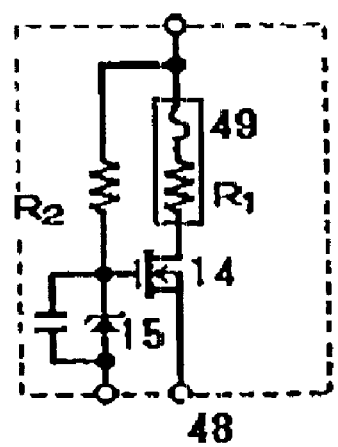

Next, other preferred embodiments of the present invention will be described with reference to FIG. 4A to FIG. 4C. Note that while FIG. 4A to FIG. 4C show only the start-up means for the sake of simplicity, the general configuration of each of these embodiments is otherwise the same as that of FIG. 1 and thus will not be further described below. Each of start-up means 45 and 47 illustrated in FIG. 4A and FIG. 4B further includes a thermal protection element 46 whose resistance rapidly increases when the temperature thereof exceeds a predetermined temperature. The thermal protection element 46 may be, for example, a positive temperature coefficient resistor (PTC). The positive temperature coefficient resistor 46 may be of any suitable type, but is typically Posistor, Polyswitch, or the like. In the start-up means 45 illustrated in FIG. 4A, the Posistor 46 is thermally coupled to the MOSFET 14. Therefore, for example, when the start-up of the switching power supply takes a long time and a current flows through the MOSFET 14 for a long time, resulting in an increase in the temperature of the MOSFET 14, the resistance of the Posistor 46 rapidly increases, thereby reducing the current flow through the MOSFET 14. Thus, it is possible to decrease the temperature of the MOSFET 14, and to prevent the MOSFET 14 from being damaged by heat. Similarly, in the start-up means 47 of FIG. 4B, the Posistor 46 is thermally coupled to the resistor R1 and the MOSFET 14, whereby it is possible to prevent the resistor R1 and the MOSFET 14 from being damaged due to overheating.

Start-up means 48 illustrated in FIG. 4C further includes a fuse element 49 that is opened when the current flow therethrough exceeds a predetermined current value. The fuse element 49 may typically be a fuse resistor. Therefore, even when an excessive current flows through the MOSFET 14, the fuse resistor 49 is opened, thereby preventing the MOSFET 14 from being damaged due to the excessive current flow.

Figure 5:
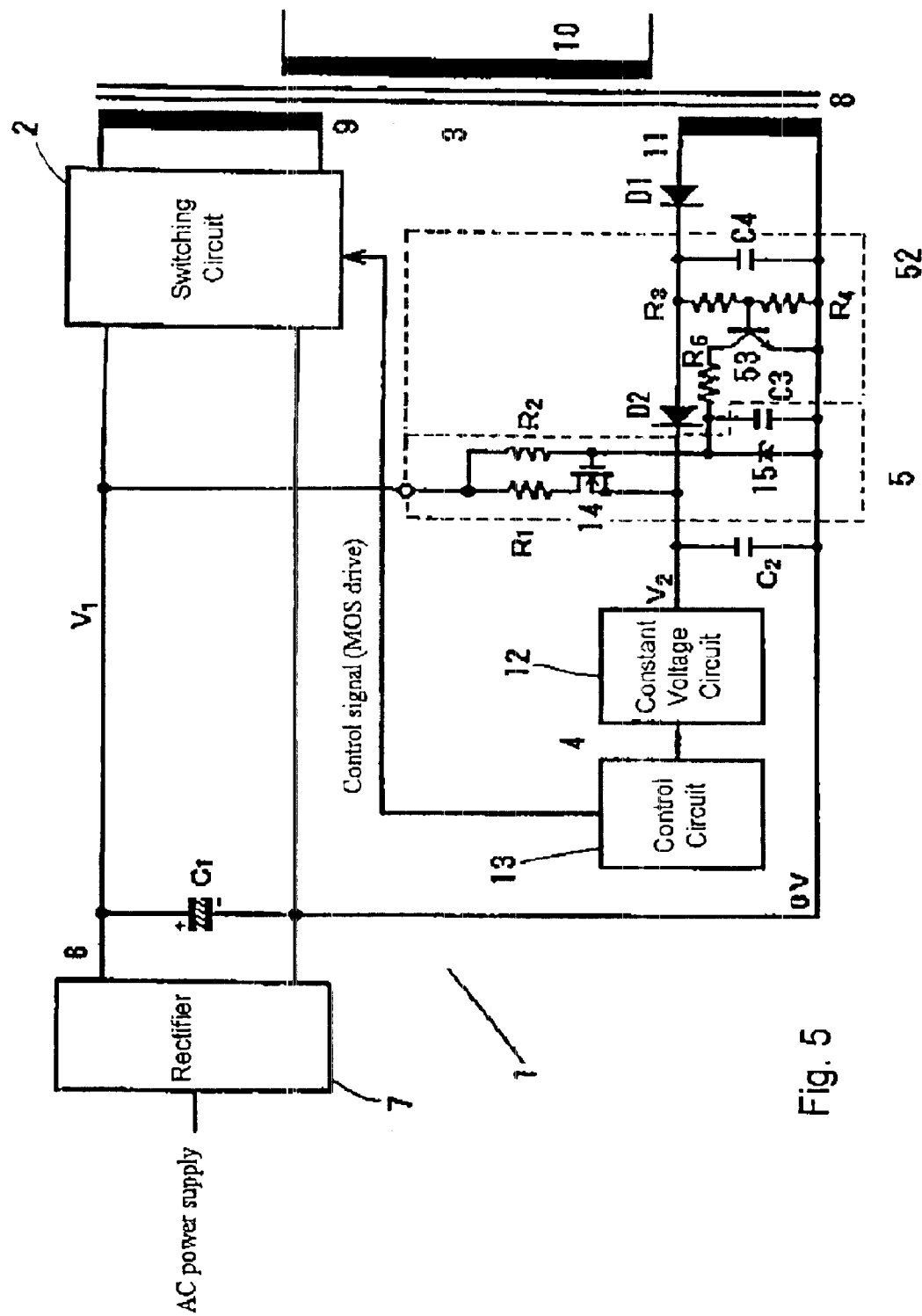
FIG. 5 is a block diagram illustrating a switching power supply according to another embodiment of the present invention.

Next, still another preferred embodiment of the present invention will be described with reference to FIG. 5. FIG. 5 is a block diagram illustrating a switching power supply 51 of the present embodiment, and those elements that are already shown in FIG. 1 will not be further described below. The switching power supply 51 further includes voltage switching means 52.

The voltage switching means 52 switches the gate voltage of the MOSFET 14 to a voltage less than V2 min (the minimum input voltage required to drive the control means 4), when the driving voltage from the third coil section 11 (i.e., the voltage that has been stored in the capacitor C2 due to the current from the third coil section 11) is greater than V2 min. Specifically, the voltage switching means 52 includes a switching element 53, and when the voltage that has been stored in the capacitor C2 due to the current from the third coil section 11 is greater than V2 min, the switching element 53 is turned ON to switch the gate voltage of the MOSFET 14 to a voltage less than V2 min.

The voltage switching means 52 includes the switching element 53 (e.g., a bipolar transistor), resistors R3 to R5 and a diode D2. With the provision of the diode D2, it is possible to prevent the transistor 53 from being turned ON by the current flowing through the MOSFET 14. Moreover, Expression 2 below is satisfied, whereby it is possible to turn ON the transistor 53 when the driving voltage from the third coil section 11 (the voltage that is stored in the capacitor C2 due to the current from the third coil section 11) is greater than V2 min (i.e., when the voltage stored in a capacitor C4 is greater than V2 min+VD). Furthermore, Expression 3 below is satisfied, whereby the gate voltage of the MOSFET 14 can be set to be less than V2 min by turning ON the transistor 53. Note that VD is the forward voltage drop of the diode D2, and VBE is the threshold voltage of the transistor 53.

$$(R3+R4)/R4 \geq (V2\ min+VD)/VBE \qquad \text{Expression 2}$$

$$\{V1 \times R5/(R2+R5)\} < V2\ min \qquad \text{Expression 3}$$

Figure 6:
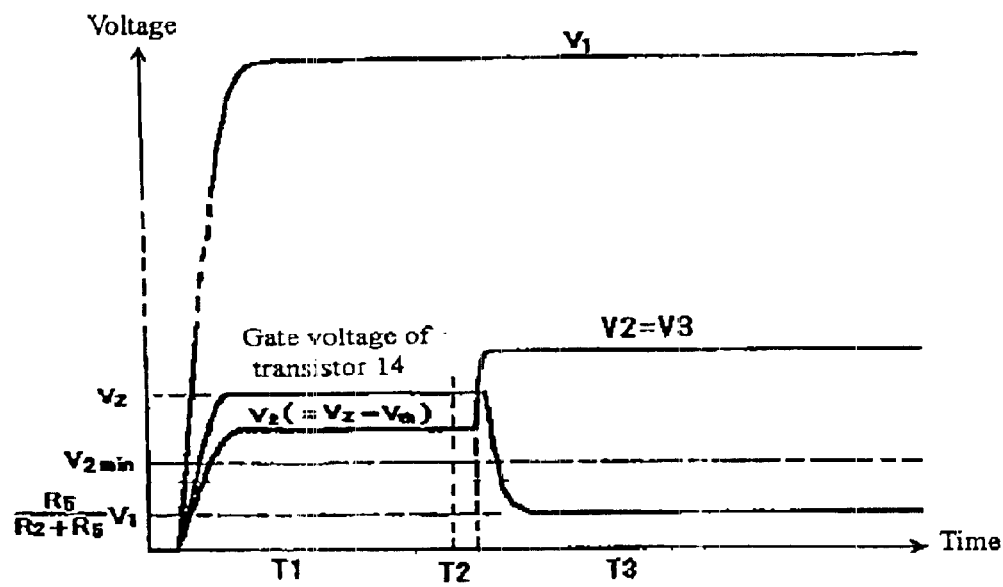
FIG. 6 is a waveform diagram illustrating an operation of the switching power supply of FIG. 5.
Figure 7:
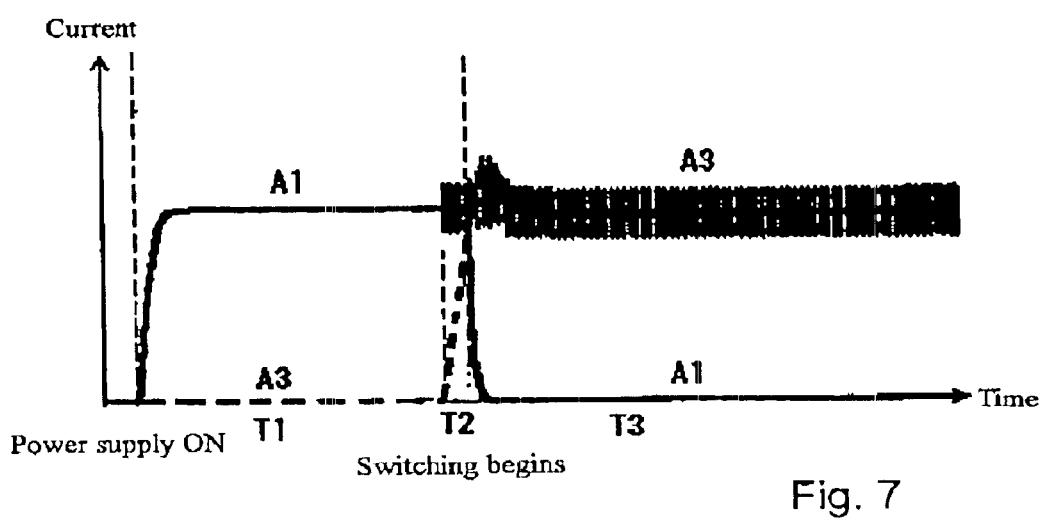
FIG. 7 is a waveform diagram illustrating an operation of the switching power supply of FIG. 5.
Figure 8:
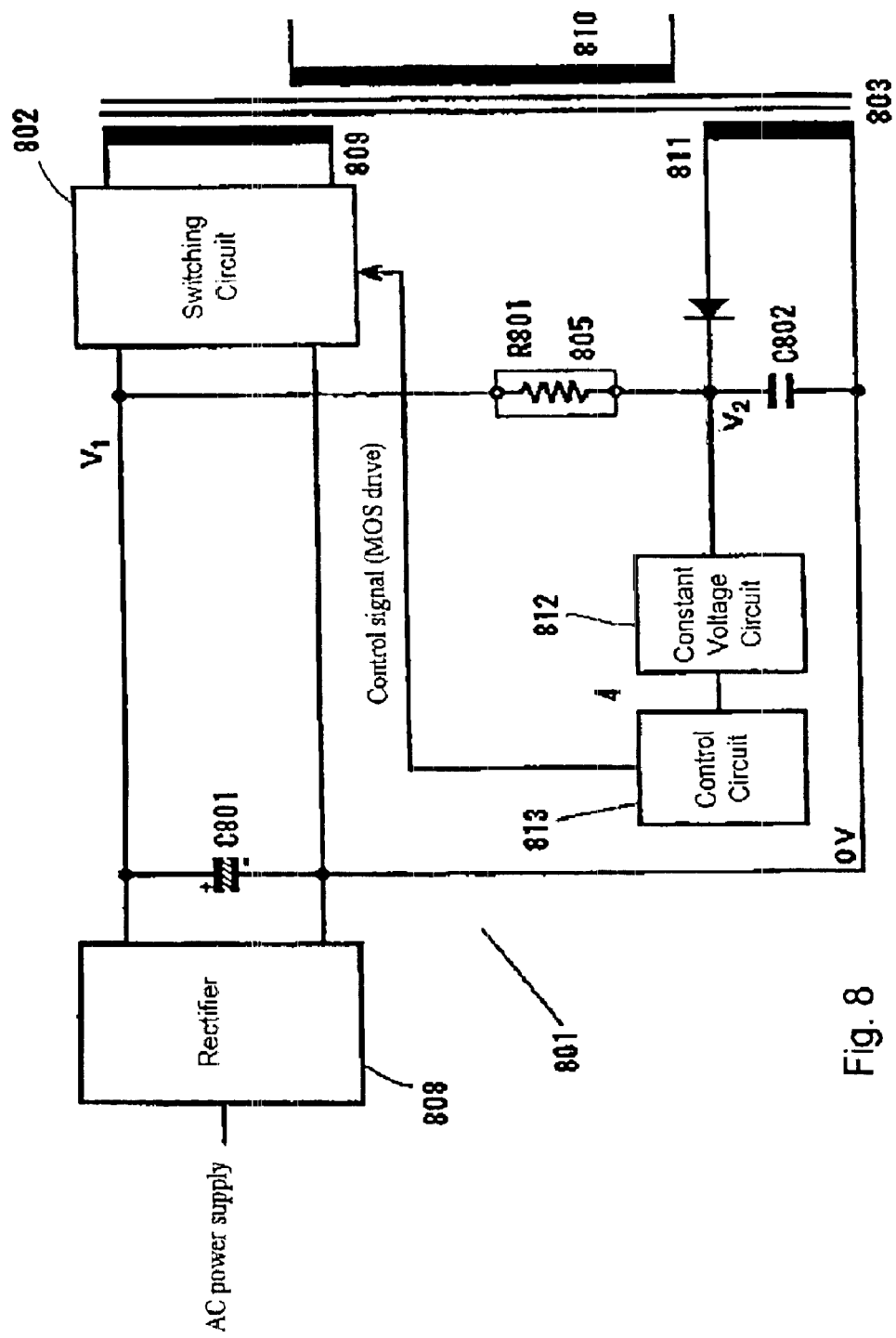
FIG. 8 is a block diagram illustrating a conventional switching power supply.
Figure 9:
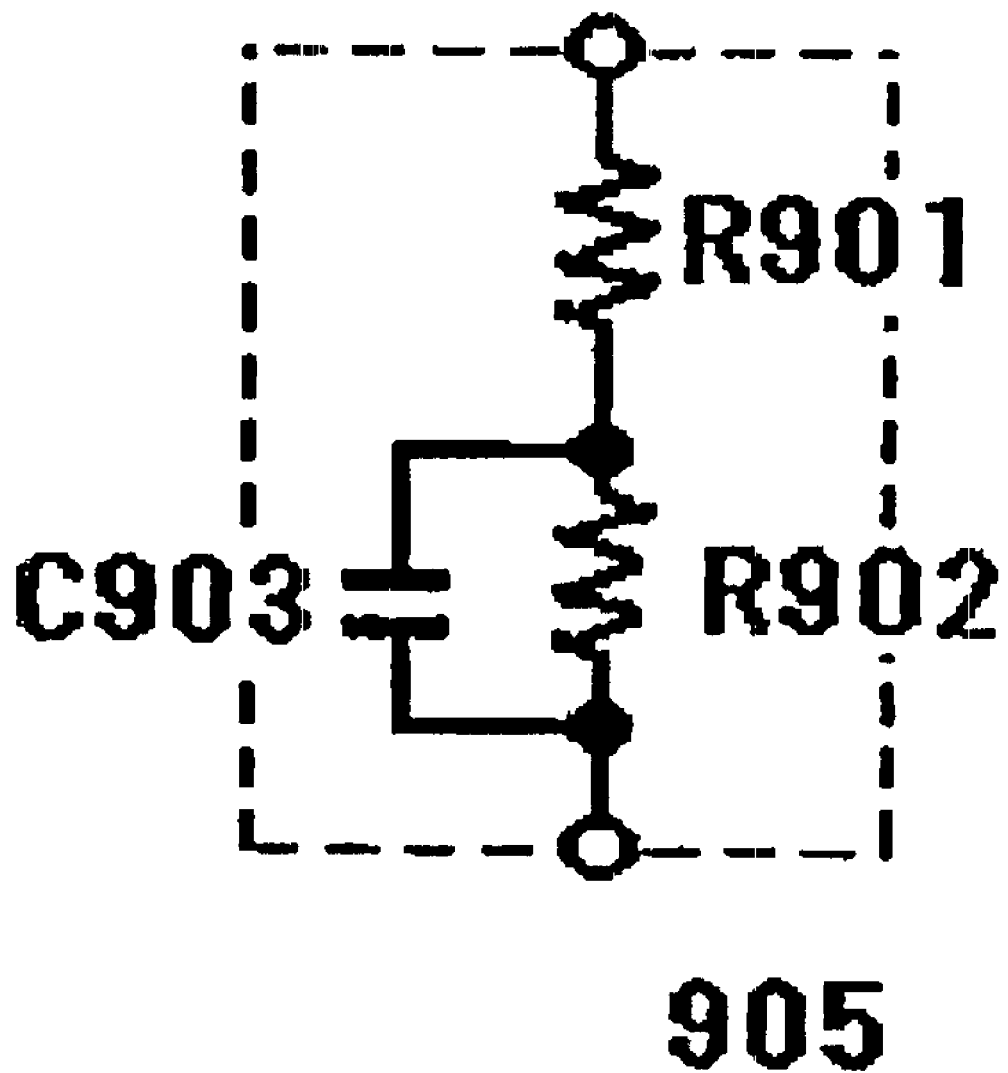
FIG. 9 is a block diagram illustrating another conventional switching power supply.

The operation of the switching power supply 51 having such a configuration will be described with reference to FIG. 6 and FIG. 7. FIG. 6 is a waveform diagram illustrating the voltages V1, V2 and the gate voltage of the MOSFET 14. FIG. 7 is a waveform diagram illustrating the current A1 flowing through the MOSFET 14 and the current A3 from the third coil section 11. The operation is the same as described above with reference to FIG. 2 until the switching power supply transitions into the steady operation (i.e., in periods T1 to T2). After the switching power supply 51 has transitioned into the steady operation (in period T3), the driving voltage from the third coil section 11 (the voltage stored in the capacitor C2) is greater than V2 min, i.e., the voltage stored in the capacitor C4 is greater than V2 min+ VD. Therefore, based on Expression 2, the threshold voltage VBE occurs between the base and the emitter of the transistor 53, thereby turning ON the transistor 53. Thus, the gate voltage of the MOSFET 14 transitions from the voltage Vz provided from the Zener diode 15 to V1×R5/(R2+R5) (FIG. 6). Herein, based on Expression 3, the gate voltage of the MOSFET 14 is less than V2 min. Therefore, unless the driving voltage from the third coil section 11 (the voltage stored in the capacitor C2) is decreased below V2 min, the MOSFET 14 will always be reversely biased, and the MOSFET 14 can reliably be OFF.

Therefore, even if the driving voltage from the third coil section 11 is decreased due to the fluctuation of the external power supply V1, etc., the MOSFET 14 can reliably be OFF, unless it is decreased below V2 min, whereby it is possible to reliably prevent the wasteful power consumption. Note that when the driving voltage from the third coil section 11 is decreased below V2 min, the transistor 53 is turned OFF, and the gate voltage of the MOSFET 14 becomes the constant voltage Vz. Therefore, the driving voltage can be provided from the start-up means 5 due to the current flow from the external power supply line V1 into the capacitor C2 via the MOSFET 14. Thus, when the control means 4 cannot be driven by the driving voltage from the third coil section 11, the control means 4 can be driven by the driving voltage from the start-up means 5.

While preferred embodiments of the present invention have been described above, the present invention is not limited to these embodiments. For example, in the configuration of FIG. 5, a capacitor may be connected in parallel to the resistor R4, so that the transistor 53 can be turned ON after the driving voltage from the third coil section 11 has become sufficiently stable. Moreover, in the configuration of FIG. 5, start-up means may include a thermal protection element and/or a fuse element.

The switching power supply of the present invention can be started up reliably because a voltage is provided to the control means from the start-up means when the voltage output from the start-up means is greater than the driving voltage produced by the output means. Furthermore, when the voltage output from the start-up means is less than the driving voltage produced by the output means, the current path is blocked in the startup means so that no voltage is provided to the control means from the start-up means, whereby it is possible to reduce the power consumption during the steady operation.

The switching power supply of the present invention may suitably be used as a power supply circuit for an audio amplifier, for example.

What is claimed is:

1. A switching power supply, comprising:

switching circuit for receiving an external power supply and being turned ON/OFF so as to output a pulse;

output circuit for receiving an output from the switching circuit to output a voltage to an outside and producing a driving voltage;

start-up circuit including a transistor for receiving the external power supply to produce a driving voltage;

control circuit driven by the driving voltage produced by the output circuit or the driving voltage produced by the start-up circuit for turning ON/OFF the switching circuit; and voltage switching circuit for switching a voltage to be provided to a control electrode of the transistor to a voltage that is less than a minimum input voltage required to drive the control circuit, when the driving voltage produced by the output circuit is greater than the minimum input voltage required to drive the control circuit, wherein:

when the driving voltage produced by the start-up circuit is greater than the driving voltage produced by the output circuit, the driving voltage from the start-up circuit is provided to the control circuit; and when the driving voltage produced by the start-up circuit is less than the driving voltage produced by the output circuit, a current path is blocked in the start-up circuit so that no driving voltage is provided from the start-up circuit to the control circuit, wherein the voltage switching circuit comprises a switching element for being turned ON/OFF based on the driving voltage produced by the output circuit so as to switch the voltage to be provided to the control electrode of the transistor, the start-up circuit further comprises a constant voltage generation section for receiving the external power supply to provide a constant voltage to the control electrode of the transistor, the transistor is a MOSFET, the constant voltage generation section comprises a Zener diode whose cathode is connected to a gate of the MOSFET, and the start-up circuit further comprises a first resistor provided between a drain of the MOSFET and an external power supply line, and a second resistor provided between the gate of the MOSFET and the external power supply line, and the voltage switching circuit comprises a transistor and a third resistor, one end of the third resistor is connected between the second resistor and the Zener diode, and the other end of the third resistor is connected to the transistor comprised within the voltage switching circuit.

2. A switching power supply according to claim 1 wherein:

when the driving voltage produced by the start-up circuit is less than the driving voltage produced by the output circuit, the transistor is turned OFF based on an electric potential difference between the voltage to be provided to a control electrode of the transistor and the driving voltage produced by the output circuit, so that no driving voltage is provided from the start-up circuit to the control circuit.

3. A switching power supply according to claim 1, wherein the start-up circuit further comprises a thermal protection element whose resistance increases when a temperature thereof exceeds a predetermined temperature.

4. A switching power supply according to claim 1, wherein the start-up circuit further comprises a fuse element that is opened when a current flow therethrough exceeds a predetermined value.

* * * * *